(12) United States Patent
Yamaguchi

(10) Patent No.: US 6,617,724 B2
(45) Date of Patent: Sep. 9, 2003

(54) NON-CIRCULAR, FLAT MOTOR

(75) Inventor: Tadao Yamaguchi, Gunma-ken (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 0 days.

(21) Appl. No.: 09/770,383

(22) Filed: Jan. 29, 2001

(65) Prior Publication Data

US 2001/0011849 A1 Aug. 9, 2001

(30) Foreign Application Priority Data

Jan. 27, 2000 (JP) ........................... 2000-019097
Jan. 27, 2000 (JP) ........................... 2000-019098

(51) Int. Cl.[7] ............................................. H02K 33/18
(52) U.S. Cl. ........................ 310/71; 310/36; 310/89
(58) Field of Search ........................... 310/89, 71, 36, 310/268

(56) References Cited

U.S. PATENT DOCUMENTS 5,175,459 A * 12/1992 Danial et al. ............... 310/81
6,274,955 B1 * 8/2001 Satoh et al. ................. 310/71

* cited by examiner

Primary Examiner—Burton Mullins
(74) Attorney, Agent, or Firm—Leydig, Voit & Mayer, Ltd.

(57) ABSTRACT

A non-circular flat motor in which terminal portions are installed at dead spaces and a manufacturing method. The motor can be easily held by a transferring apparatus and automatically mounted. The feeder terminal is easily reflow soldered. A rotor and a housing supporting the rotor are non-circular when in a plane perpendicular to the rotor axis. Feeder terminals or installation terminals are arranged at corners of surfaces of the housing. At least one feeder terminal is insulated from other portions of the housing. The corners may be concave so that each of the terminals does not protrude beyond the housing. Each of the terminals is easily reflow-soldered and exposed at the side of the housing.

16 Claims, 9 Drawing Sheets

NON-CIRCULAR, FLAT MOTOR

BACKGROUND OF THE INVENTION

1. Field of the Invention

The present invention relates to a flat motor used as a silent alarm source in a mobile communications apparatus, and more particularly, to a non-circular, flat motor in which terminal portions are installed in dead space.

2. Description of the Related Art

Vibration motors using a centrifugal force of an eccentric body are now used as a silent alarming source in mobile communications apparatuses. Also, there is a flat coreless motor having a pinion gear at an output shaft which is used for transferring a pickup for detecting signals of a disc medium.

A conventional cylinder type vibration motor having a diameter of 4 mm is currently being widely used. However, since the vibration motor is mounted using a holder, the actual diameter thereof becomes 5 mm, which has not kept pace with the ongoing trend in miniaturizing portable apparatus. Furthermore, the vibration motor is a narrow cylinder so that sufficient space in a radial direction for an eccentric weight installed at an output shaft cannot be secured, resulting in weak vibrations. In comparison, a flat motor having a thickness of 3 mm can be easily obtained. Also, a large space in a radial direction can be obtained. The conventional flat vibration motor is shown in FIG. 12.

Referring to FIG. 12, a bracket B is formed of a magnetic body which is also used as a yoke. A thin disc magnet D is located on the bracket B and a shaft holder Ba is formed by raising a central portion of the bracket B. A shaft S is pressed into the shaft holder Ba and fixed thereto. An eccentric rotor R is rotatably installed at the shaft S to face the magnet D with an axial gap. The bracket B is covered by a thin case K.

A flat commutator C is formed of a printed circuit board and installed at the eccentric rotor R. A pair of brushes Br for providing electric power to the flat commutator C by slide-contacting the brushes Br are soldered to a thin flexible sheet FS. The flexible sheet FS, which extends outward between the magnet D and the bracket B, serves as a feeder terminal.

With a recent trend in small and light mobile communication apparatus, electric parts mounted thereon must be small and light and there is a need for parts that can be reflow soldered, a type of soldering used in automation of an assembly process. However, in the case of an apparatus using an electric part having a magnet, such as the flat motor, the magnet thermally deteriorates due to the high temperature during the process of reflow soldering. Also, it is difficult to hold the conventional motor, which is circular when viewed in a plane, with a transferring apparatus and the flexible sheet is very likely to be damaged when it is automatically mounted.

Also, in a method of installing the brushes Br at the thin flexible sheet FS by soldering, a displacement due to the spring force of the brushes Br when they slide-contact the flexible sheet FS needs to be prevented, so that the entire process becomes complicated. Also, the shaft itself becomes very small so that the manufacturing price of the shaft increases or the process of inserting the shaft is complicated.

SUMMARY OF THE INVENTION

To solve the above problems, it is an object of the present invention to provide a non-circular flat vibration motor which does not adopt a flexible sheet type feeder terminal, has a non-circular shape when viewed in a plane so as to be easily held by a transferring apparatus and automatically mounted, and has feeder terminals which are easily soldered, and a manufacturing method thereof.

Also, it is another object of the present invention to provide a non-circular flat vibration motor which uses a housing member instead of the shaft and can be simultaneously operated without a the flexible sheet and can be reflow soldered, and a manufacturing method thereof.

Also, it is yet another object of the present invention to provide a light, non-circular, flat vibration motor.

Accordingly, to achieve the above objects, there is provided a non-circular flat motor comprising a rotor, a housing formed to be non-circular when viewed in a plane which supports the rotor to be capable of rotating and simultaneously at least a part of side surfaces has a flat surface, and a plurality of feeder terminals arranged at an angled corner at the side surface of the housing which is formed by electrically insulating at least one terminal of high electric potential from other portions adjacent thereto.

It is preferred in the present invention that the armature coil is arranged at a stator base functioning as part of the housing and simultaneously a magnet facing the armature coil is arranged at the rotor.

Also, it is preferred in the present invention that the housing is substantially rectangular and at least some of the feeder terminals are formed not to protrude outward over a corner of the rectangle as an angled portion for installation.

Also, it is preferred in the present invention that the motor further comprises a flat magnet, a bracket as part of the housing where the magnet is arranged, a brush incorporated with the feeder terminals via a gap between the bracket and the magnet, wherein the rotor receives electric power from the brush and simultaneously faces the flat magnet via a gap in an axial direction.

Also, it is preferred in the present invention that a base end portion of the brush is formed as part of the feeder terminal as it is.

Also, it is preferred in the present invention that the housing is substantially rectangular and at least some of the feeder terminals are formed not to protrude outward over a corner of the rectangle as an installation portion.

Also, to achieve the above objects, there is provided a non-circular flat motor comprising a rotor, a housing including a stator base having a shaft for supporting the rotor provided at the center thereof and having a non-circular shape, part of the housing being formed of resin, and at least two feeder terminals arranged at an angled corner at the side surface of the housing which is formed by electrically insulating at least one terminal of high electric potential from other portions adjacent thereto.

It is preferred in the present invention that the shaft is installed by erecting a shaft core from part of the housing constituting a stator, and coating the shaft core with resin to form a resin coated, fixed shaft, and the rotor is rotatably installed from a tip of the resin coated, fixed shaft and the tip of the shaft is inserted in a concave portion installed at the other portion of the housing.

Also, it is preferred in the present invention that the motor further comprises a yoke plate formed of a magnetic body and having the shaft core integrally protruding from the center thereof, constituting part of the housing, a brushless recess portion formed at the yoke plate to insulate the brush at least at one side, a resin bracket portion which includes a resin coated, fixed shaft made by incorporating in the resin bracket portion at least part of the yoke plate and coating the shaft core with resin, a rotor including a commutator and an armature coil having one end portion connected to the commutator and rotatably arranged at the resin coated, fixed shaft to face a magnet via a gap, a pair of brushes having a free end in sliding contact with the commutator and fixed such that at least two surfaces can expose base ends of the resin bracket portion through the brush recess portion, the magnet arranged at least at the yoke portion of the resin bracket portion after the brushes are arranged, and a case accommodating the rotor and installed at the resin bracket by inserting a tip of the resin coated, fixed shaft in a concave portion formed at the center of the case, at least a magnetic path portion of the magnet being formed of a magnetic body.

Also, it is preferred in the present invention that the magnet is separated from the yoke plate by a small gap to enable reflow soldering.

Also, it is preferred in the present invention that the yoke plate is separated from the case except for a combined portion.

Also, it is preferred in the present invention that a portion for reflow soldering is not close to the combined portion.

Also, it is preferred in the present invention that the resin of the resin coated, fixed shaft includes potassium titanate whisker and has an anti-thermal feature bearing a thermal deformation temperature of over 200° C. (18.5 kgf/cm$^2$) and a slippery feature.

Also, to achieve the above objects, there is provided a non-circular flat brushless motor comprising a metal plate incorporating a shaft support portion at the center thereof, forming part of a housing, a fixed shaft supported by the shaft support portion, a rotor rotatably installed at the fixed shaft from a tip thereof, and a stator formed of a plurality of armature coils arranged around the fixed shaft to drive the rotor, in which the other part of the housing supports a tip of the fixed shaft.

It is preferred in the present invention that the fixed shaft has a shaft core cut from a metal plate and the shaft core is coated with resin.

Also, it is preferred in the present invention that a pinion is incorporated in the rotor.

Also, it is preferred in the present invention that the rotor is formed to be eccentric to generate vibrations during rotation.

Also, to achieve the above objects, there is provided a method of manufacturing a brush type non-circular flat motor comprising the steps of press-pressing a lead frame having a plurality of yoke plates continuously installed at a predetermined pitch by a connection portion, inserting the continuously installed yoke plates in an injection mold and integrally molding a resin bracket, detaching at least the connection portion of the yoke plates among the respective connection portions, installing the rotor at a fixed shaft to be capable of rotating, and installing the case.

It is preferred in the present invention that the method further comprises steps of fixing brushes to a resin bracket by a spot welding method, the brushes being formed by continuously installing via a plurality of connection portions at the same pitch as the predetermined pitch, and installing a magnet at the yoke plate.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
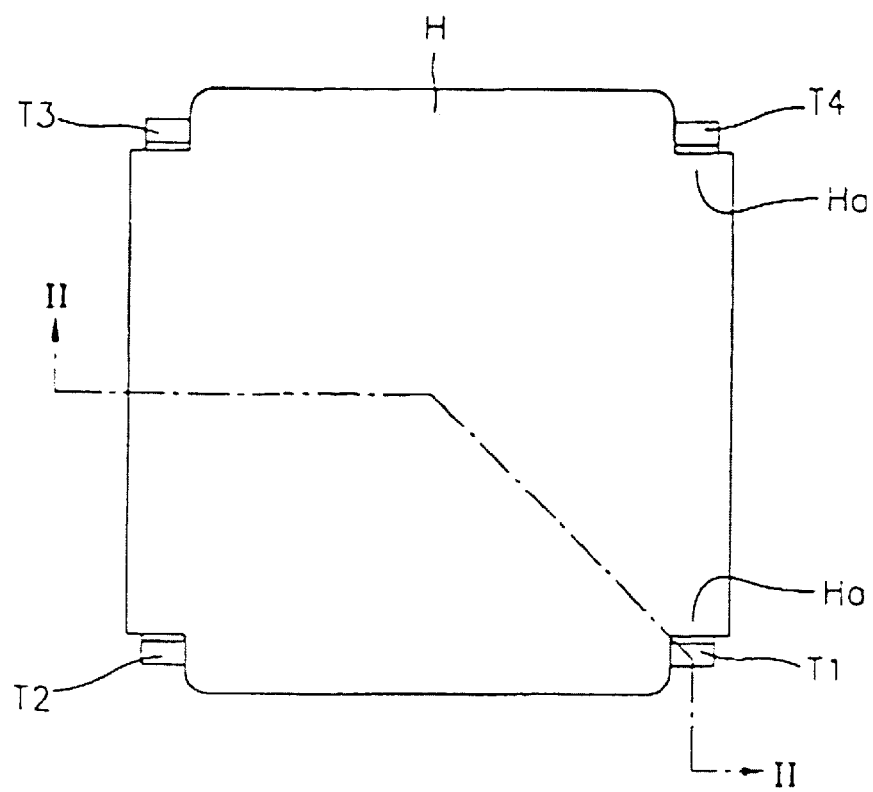
FIG. 1 is a plan view showing a feature of a non-circular (square-shaped) flat motor of the present invention.

In the below-described preferred embodiments, the same elements having the same functions are indicated by the same reference numerals and repeated descriptions thereof will be omitted.

FIG. 1 shows a feature of a square-shaped flat motor of the present invention. Referring to the drawing, a housing H has a built-in rotor and the top view thereof is square-shaped. Feeder terminals T1 and T2 or dummy or electricity feeding installation terminals T3 and T4 which are integrally formed by exposing part of a flexible sheet FT are arranged at the corner portions Ha. The corner portion Ha is formed to be concave such that each of the terminal, T1–T4 does not protrude from the housing H. That is, the respective terminals T1–T4 are located in the corner portions of the housing H.

Here, a non-circular shape may be any shape such as a square, a rectangle, or a polygon, or may be a shape like a keyhole, when viewed in a plane. Also, in the present embodiment, each terminal is exposed by being folded so that reflow soldering can be easily performed.

The motor having the above shape can be applied to a variety of types such as a brushless type or a brush attached type. In this description, it is assumed that a brushless type motor consists of a rotor including a magnet and a housing including an armature motor, while a brush attached motor consists of a rotor including an armature coil and a housing including a magnet. That is, a rotating portion of a motor is called a rotor and the remaining portion other than the rotor is called a housing.

Figure 2:
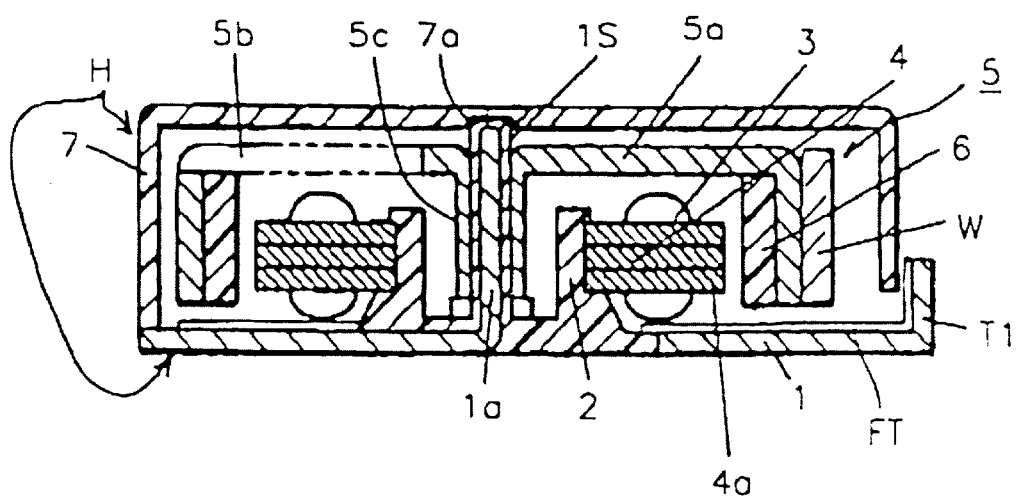
FIG. 2 is a sectional view of a brushless type non-circular flat vibration motor according to a preferred embodiment of the present invention, taken along line II—II of FIG. 1.

FIG. 2 shows a cross section of a square-shaped, axially gapped, brushless type flat motor, taken along line II—II of FIG. 1. That is, a shaft core 1a protrudes from the center of a metal stator base 1 to which a printed circuit board is attached, and the shaft core 1a is coated with slippery resin to form a resin coated, fixed shaft 1S. A core holder 2 is integrally formed of the same resin slightly further out in the axial direction from the resin coated, fixed shaft 1S. A stator core 4 made by winding an armature coil 3 around a plurality of salient poles is welded to the core holder 2.

Since the rotor 5 is used as a vibration motor, a notch 5b is formed at a portion of a rotor case 5a. Also, a weight W formed of tungsten alloy is installed at the opposite position to the notch 5b at the outer surface of the rotor case 5a, forming eccentricity. A barring hole 5c which is further inwardly formed and a resin ring magnet 6 facing a plurality of blades 4a of the stator core 4 with a gap therebetween are installed at the rotor case 5a. The rotor case 5a is rotatably installed at the resin coated, fixed shaft 1S and excited by the stator core 4.

A leading end of the resin coated, fixed shaft 1S is supported by a concave portion 7a formed in a square cover 7 forming the housing H to provide reinforcement in a radial direction. Here, to constitute a brushless motor, a well known three-phase, sensor-less type structure is used and each of the above-described terminals function as both electrical connectors and mounts for the motor.

Figure 3:
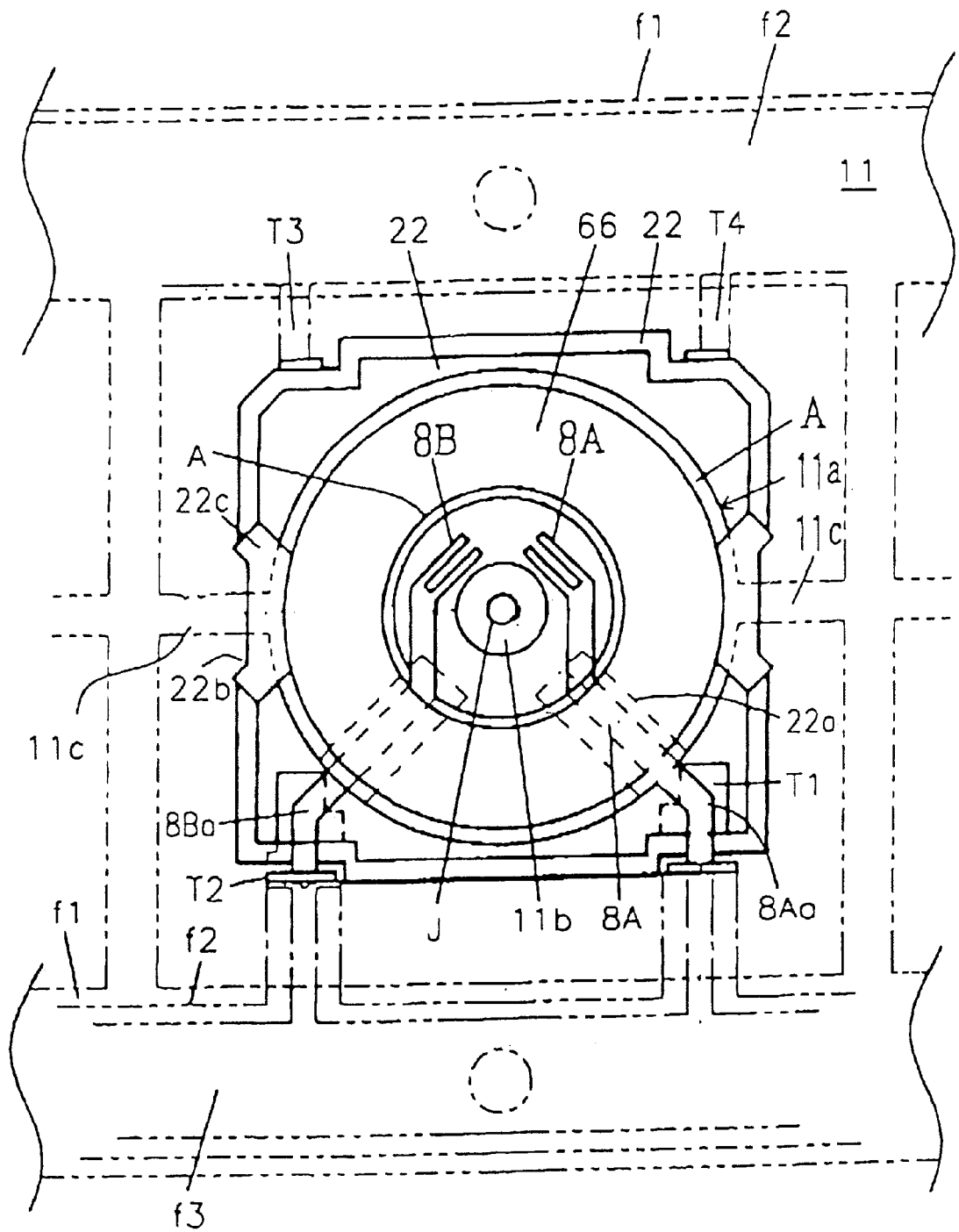
FIG. 3 is a cross sectional view of a coreless type non-circular flat vibration motor according to a second preferred embodiment of the present invention.

FIG. 3 shows a brush attached non-circular coreless flat vibration motor according to a second preferred embodiment of the present invention. A yoke 11a formed of a magnetic body is formed as a member of a bracket 11 which is a part of a housing. A shaft holder 11b protrudes from the center and a shaft J is fixed to the shaft holder 11b. The yoke 11a is cut from a first lead frame f1 formed of galvanized steel sheet having a thickness of 0.35–0.4 mm and integrally formed with a base 22 formed of liquid crystal, exhibiting an anti-solderability feature and having a square shape like the four terminals T1, T2, T3 and T4 including a dummy. The respective terminals T1 through T4 are cut from a second lead frame f2 formed of a thin plate which is corrosion resistant and easily soldered by a solder such as German silver. A thin disc magnet 66 having a thickness of about 0.8 mm is placed on the yoke 11a. Elastic brushes 8A and 8B coated with noble metal and having a thickness of about 0.05 mm are arranged in the inner radius area of the magnet 66. Base end portions 8Ac and 8Bc of the brushes 8A and 8B passing under a lower portion of the magnet 66 installed in the subsequent process are spot-welded to the terminals T1 and T2. The magnet 66 is installed at the bracket 11 via an acryl-based attaching member A having a thickness of about 0.15 mm from the surface of the brushes 8A and 8B for insulation of the brushes. Here, the brushes 8A and 8B are cut from a third lead frame f3 into a predetermined shape at the same pitch as those of the first and second lead frames f1 and f2. After the base 22 is formed, the brushes 8A and 8B are spot-welded to the terminals T1 and T2. Alternatively, the base end portions 8Aa and 8ba are extended outside and serve themselves as terminals.

In this case, the brush 8A is used as a feeder terminal for supplying a high electric potential and a recess groove 22a is located at a neutral position of the magnet 66 to insulate the feeder terminal from other elements adjacent thereto. Also, for insulation of the bracket 11, a concave portion 22b for a recess is located where a connection portion 11c of the yoke 11a is cut. At least one of a plurality of magnet arrangement guides 22c protrudes and faces the magnet and is coated with resin.

Figure 4:
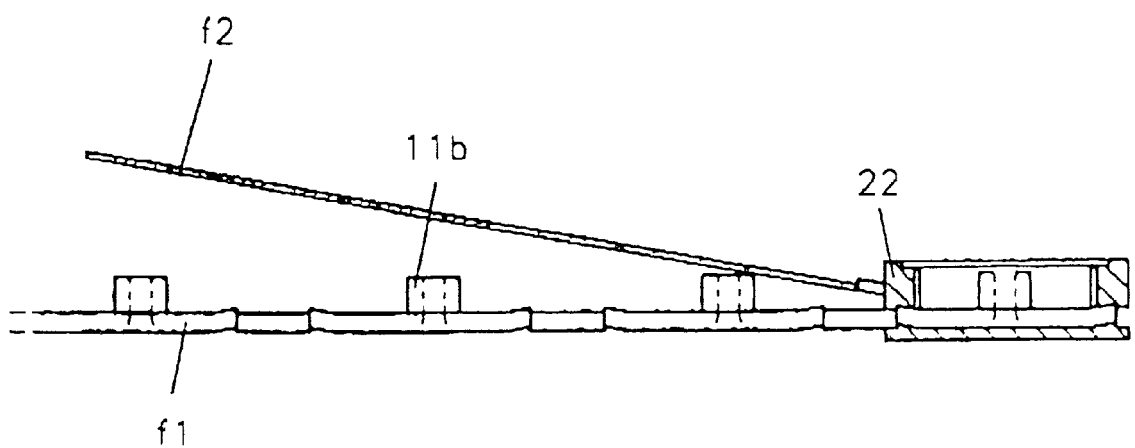
FIG. 4 is a view for explaining a method of manufacturing a part of the motor shown in FIG. 3.

To manufacture parts of the motor, for example, the stator base 22 of FIG. 3, as shown in FIG. 4, the first lead frame f1 of a galvanized steel sheet having a thickness of about 0.35 mm where the yoke portion is continuously formed at a necessary arrangement pitch and the second lead frame f2 of a German silver having a thickness of about 0.15 mm where the terminal portions are continuously formed corresponding to the above arrangement pitch, part of the second lead frame f2 being insulated, are continuously provided to a mold for integrally injection-molding the base 22 by taking, for example, 20 yoke portions, so that each is integrally formed of liquid crystal having an anti-solderability feature into a desired shape. Then, the coil is installed and a predetermined task such as wiring is performed, the continuously installed portion is severed and the respective terminal portions having predetermined shapes are used.

Figure 5A:
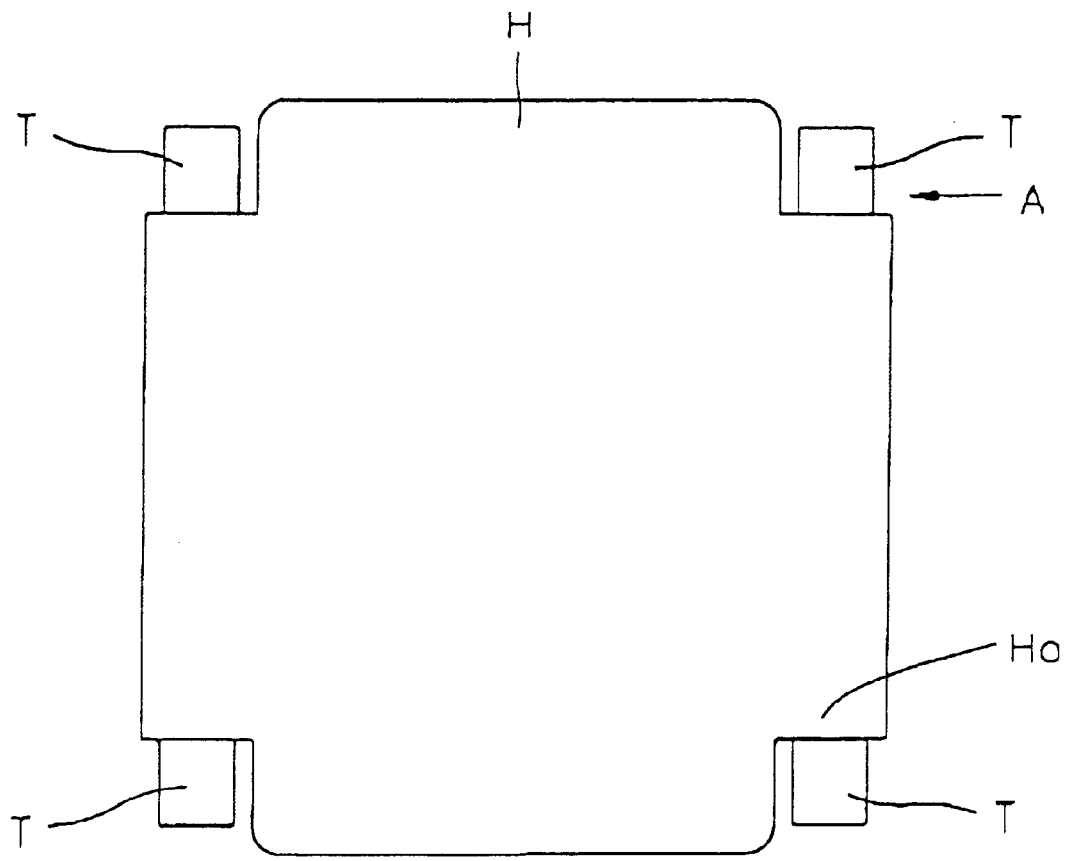
FIG. 5A is a plan view showing a feature of a modified example of the non-circular flat motor of FIG. 1.
Figure 5B:
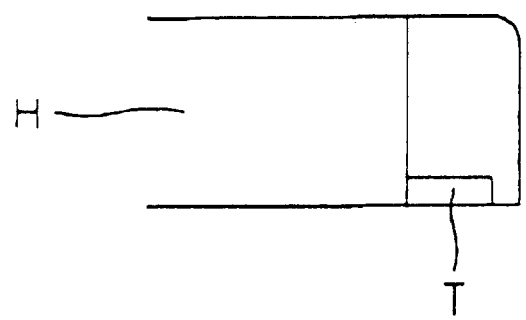
FIG. 5B is a side view o the motor of FIG. 5A viewed from the side indicated by arrow A.

FIG. 5A shows a modified example of the square-shaped flat motor of the present invention. While the motor in FIG. 1 has reflow type terminals, a terminal portion is formed to protrude in a latitudinal direction from the side surface in FIG. 5B so as to realize a contact type terminals. In this case, the terminal portion is formed to be compact such that it cannot protrude above an angled corner.

Figure 6A:
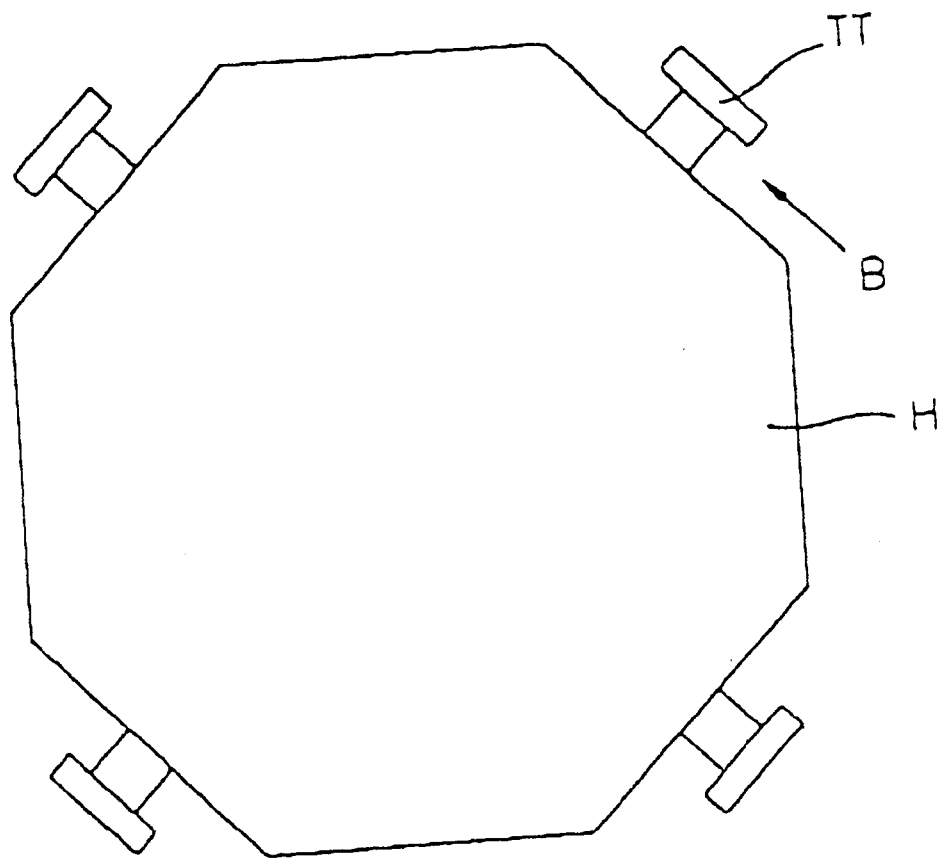
FIG. 6A is a plane view showing a feature of another modified example of the non-circular flat motor of FIG. 1.
Figure 6B:
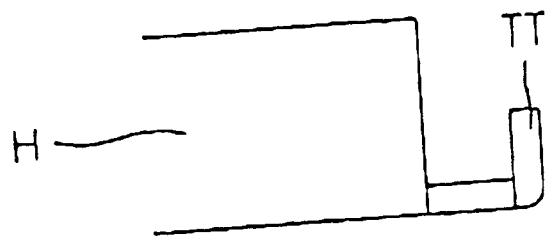
FIG. 6B is a side view of the motor of FIG. 6A viewed from the side indicated by arrow B.

FIG. 6A shows another modified example of the square-shaped flat motor of the present invention which has an essentially octagonal shape. A terminal portion TT is bent to reduce its surface area, which facilitates reflow soldering as shown in FIG. 6B. This also helps to reduce the amount of heat that the terminal conducts into the motor. In this case, the terminal portion is formed to be compact so that it does not protrude above the angled corner.

Also, in this case, it does not matter that each terminal is transferred 180° reversely considering an installation pattern by making a sole terminal or diagonally positioned terminals have the same electric potential. This is of course so the above modifications can be applied to a brushless or brush attached motor. Although in the above preferred embodiments a vibration motor using an eccentric rotor is used as a vibration source, a pinion may be arranged at a rotor and a cylindrical rotation type motor such as a pickup transfer motor in an MD (mini disc), as described below, may be adopted.

Figure 7:
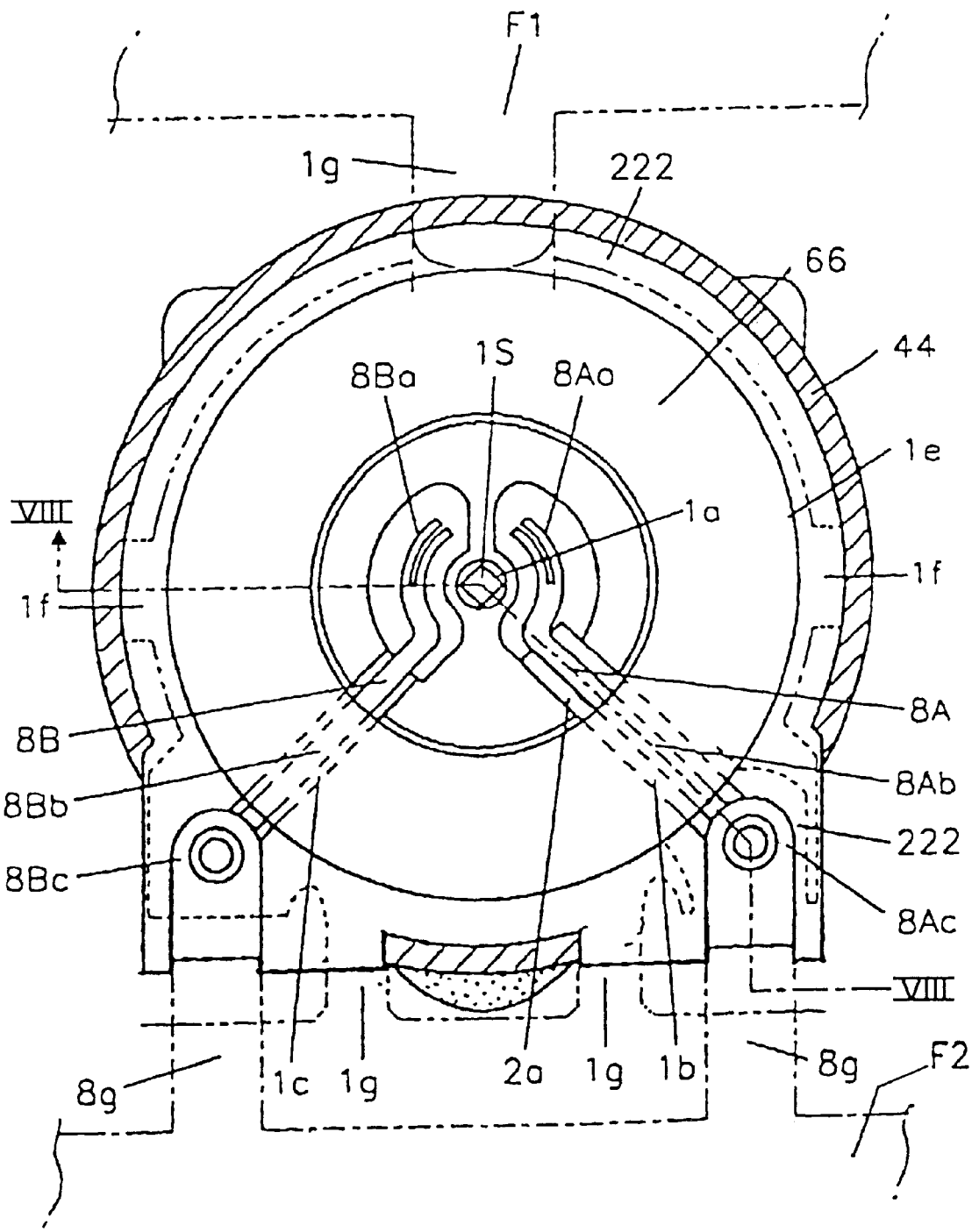
FIG. 7 is a hidden detail view from above of a coreless type non-circular flat vibration motor according to a third preferred embodiment of the present invention.
Figure 8:
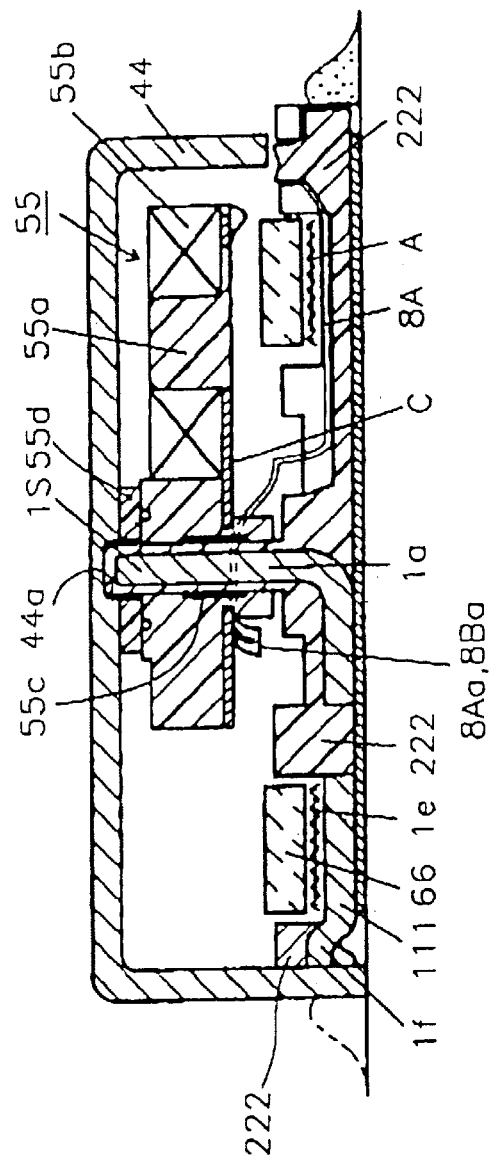
FIG. 8 is a cross sectional view of the coreless type non-circular flat vibration motor of FIG. 7 taken along line VIII—VIII of FIG. 7.

FIG. 7 shows a coreless, non-circular, flat vibration motor according to a third preferred embodiment of the present invention. That is, a yoke plate 111 is formed of a magnetic body integrally formed with a shaft core 1a protruding from the center thereof, forming part of a housing. A pair of brush recess portions 1b and 1c are formed, one of these portions, which will be described later, is formed to be insulated from the yoke plate 111. In FIG. 8, the right brush recess portion 1b is a groove while the left brush recess portion 1c is a concave portion having a substantially the same thickness as that of the brush. The concave portion is slightly wider than the width of the thickness of an extended portion of the brush. The yoke plate 111 has a resin coated, fixed shaft 1S by coating the shaft core 1a with polyphenylene sulfide resin (product name: Otska Chemical Poticon) and is integrally embedded by a resin bracket 222 except for a surface 1e where a magnet 66 is located and a connection portion 1f of a case 44 which will be described later. Here, a brush 8A, which is one of the pair of brushes arranged at the right brush recess portion 1b, is insulated from the yoke plate 111 by coating the brush 8A with resin 2a. The other brush 8B is directly arranged at the left brush recess portion 1c and grounded by contacting the yoke plate 111.

Figure 11:
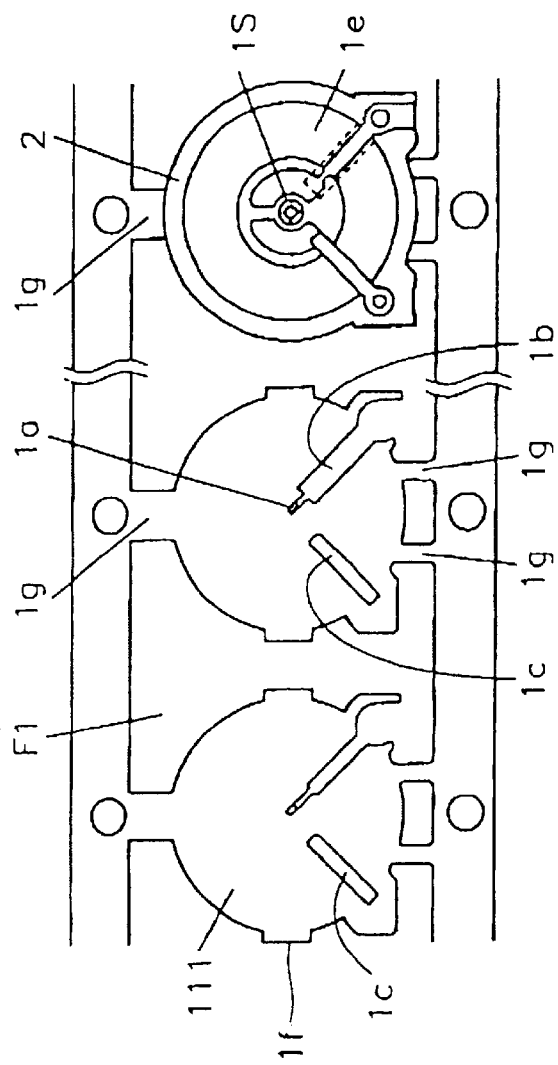
FIG. 11 is a view for explaining a method of manufacturing parts of the motor of FIG. 7.
Figure 12:
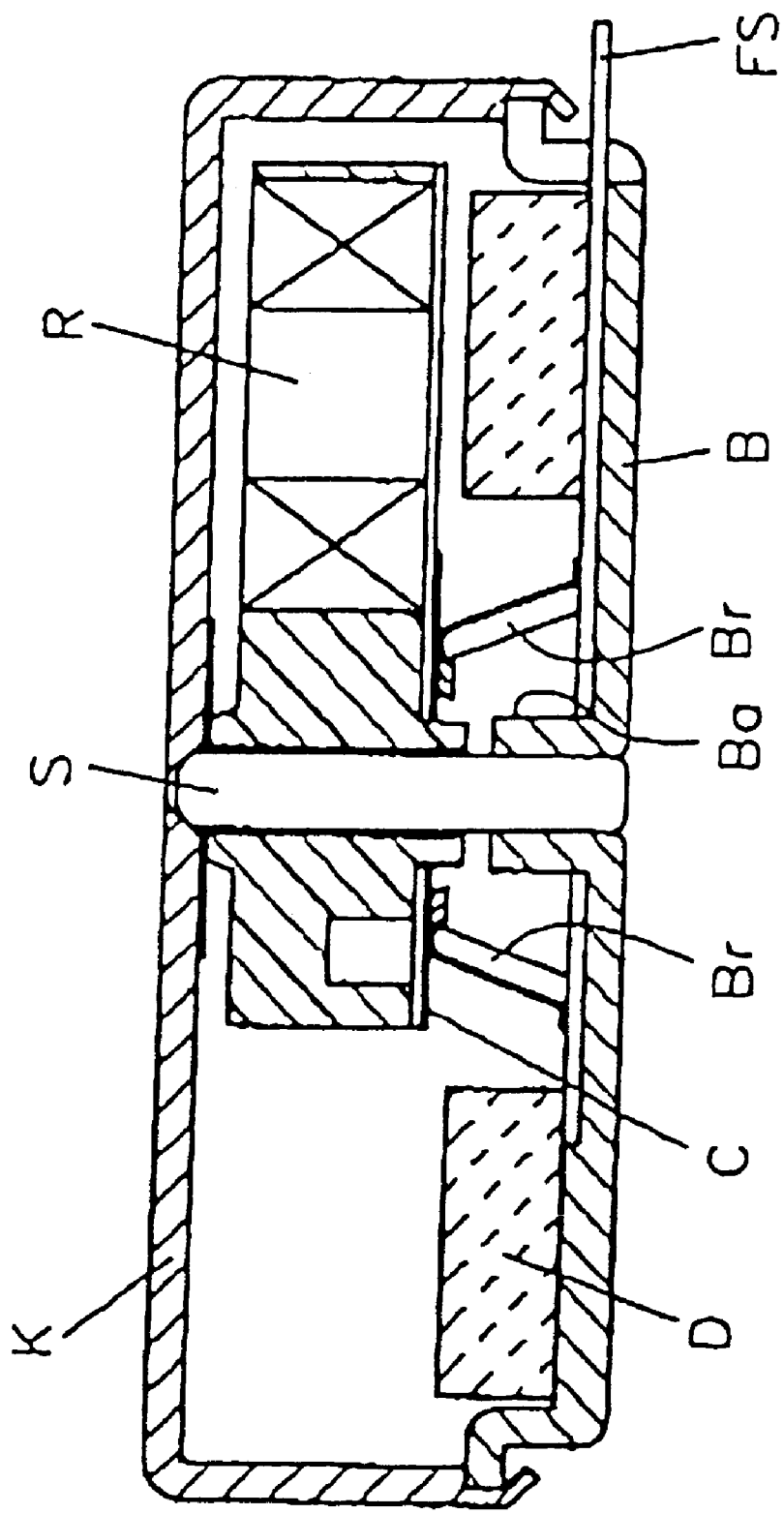
FIG. 12 is a sectional view of the conventional flat vibration motor.

To manufacture the yoke plate 111 and the resin bracket 222, as shown in FIG. 11, a lead frame F1 having a plurality of the yoke plates 111 continuously installed at a predetermined pitch by a connection portion 1g, which are formed by press-processing galvanized steel sheet into a predetermined shape, is set on an injection mold (not shown) for manufacturing the bracket 222 formed of resin at the same pitch as shown in FIG. 8. Then, the set lead frame F1 and the resin bracket 222 are continuously and integrally molded.

Sliding contact portions 8Aa and 8Ba, extended portions 8Ab and 8Bb, and base end portions 8Ac and 8Bc of the brushes 8A and 8B are formed by press-processing a thin elastic German sheet. As shown in FIG. 7, a plurality of the brushes 8A and 8B are continuously installed at the same pitch as that of the yoke via a connection portion 8g at the end of each of the base end portions 8Ac and 8Bc. The extended portions 8Ab and 8Bb are accommodated in the brush recess portions 1b and 1c. The base end portion 8Ac at one side are welded to a portion of the resin bracket portion 222 while the base end portion 8Bc at the other side is welded to the yoke plate 111. Here, the base end portion 8Ac at one side is fixed such that a surface thereof is laterally exposed to facilitate soldering. The sliding contact portions 8Aa and 8Ba of the brushes 8A and 8B are formed to be arc shaped and sliding-contact a printed wiring commutator C arranged at a rotor 55.

The rotor 55 includes a resin guide portion 55a having high density (for example, a specific gravity of 3 through 8) which is integrally formed by making the printed wiring commutator C eccentric since the rotor itself generates vibrations of a centrifugal force and a plurality of eccentric armature coils 55b which are arranged to be eccentric toward one side by being attached to the resin guide portion 55a. The rotor 55 is rotatably installed at the resin coated, fixed shaft 1S via a bearing hole 55c installed at the center thereof to face the magnet 66 through a gap.

After the brushes 8A and 8B are arranged, the magnet 66 is attached to at least the yoke plate portion of the resin bracket portion by an acryl based double side adhesive member A. Thus, the magnet 66 is separated from the yoke plate 111 and insulation is achieved during reflow soldering.

After the rotor 55 is installed, to secure strength in a latitudinal direction, a leading end of the resin coated, fixed shaft 1S is inserted in a concave portion 44a formed at the center of a case 44 so as to be installed at the resin bracket 222 as a housing. The case 44 is welded to a connection portion 1f of the yoke plate 111 using laser as indicated by a dashed line in the drawing.

In FIG. 8, reference numeral 55d indicates a thrust washer for supporting the eccentric rotor 55 to be capable of sliding in response to an upward force applied by the brushes 8A and 8B.

Figure 9:
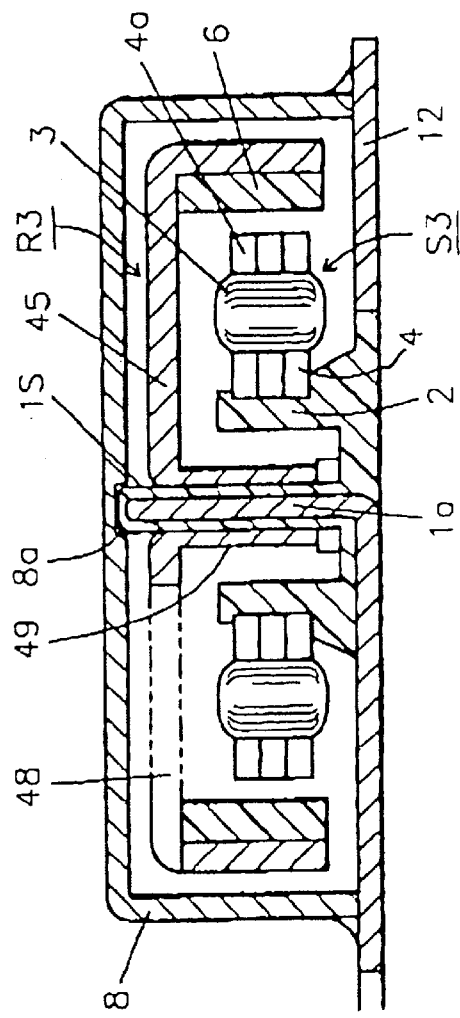
FIG. 9 is a cross sectional view of a brushless type non-circular flat vibration motor according to a fourth preferred embodiment of the present invention.

FIG. 9 shows a brushless type non-circular flat motor according to a fourth preferred embodiment of the present invention. That is, a shaft core 1 a protrudes from the center of a metal stator base (metal plate) 12 to which a printed circuit board is attached. The protruding shaft core 1a is coated with a slippery resin, thus forming a resin coated fixed shaft 1S.

A core holder 2 is integrally formed of the same resin to have a small radial separation from the resin coated, fixed shaft 1S. A stator core 4 formed by winding an armature coil 3 around a plurality of salient poles is welded to the core holder 2, thus forming a stator S3.

Here, since a rotor R3 is used as a vibration motor, a notch 48 is formed at a portion of a rotor case 45 to make the rotor R3 eccentric. A barring hole 49 having a smoothly processed inside is formed at the center of the rotor case 45. A ring type magnet 6 is installed at the rotor case 45 to face a plurality of blades 4a of the stator core 4 through a gap in a radial direction. The rotor case 45 is rotatably installed at the resin coated, fixed shaft 1S and is excited by a magnetic force from each of the blades 4a of the stator core 4. A tip of the resin coated, fixed shaft 1S is supported by a concave portion 8a arranged at a cover 8 for reinforcement in a radial direction.

Figure 10:
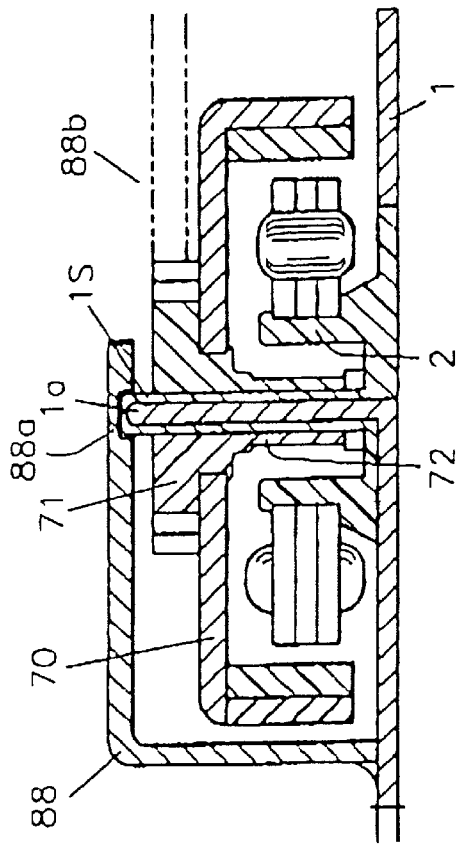
FIG. 10 is cross sectional view of a brushless type non-circular flat geared motor according to a fifth preferred embodiment of the present invention.

FIG. 10 shows a non-circular flat motor according to a fifth preferred embodiment of the present invention which is used in a cylindrical rotary brushless motor such as a pickup transfer geared motor of an MD. The difference from the second preferred embodiment of FIG. 3 is that the rotor case 70 is not formed to be unbalanced and a pinion 71 and a bearing portion 72 are integrally formed of anti-abrasion resin such as polyacetal on the upper surface of the rotor case 70.

Here, the tip of the resin coated, fixed shaft 1S is supported by a concave portion 88a arranged at a cover 88 for reinforcement in a radial direction. The cover 88 has a window 88b since a spur gear for transferring output of the pinion 71 is arranged as indicated by a dashed line.

FIG. 11 shows a method of manufacturing a part according to the preferred embodiment of FIG. 8. A bracket portion of a coreless brush attached motor can be easily manufactured in large numbers.

Also, in the manufacturing methods of the non-circular flat motor according to the above-described preferred embodiments, a plurality of yoke plates (metal plates) 1, 11, 12 and 111 which are cut from the lead frame F1 and form a part of the housing through the connection portion 1g, are continuously installed at a predetermined pitch. The connected yoke plates (metal plates) are inserted in an injection mold to integrally form resin brackets 2, 22 and 222. At lease the connection portion 1g of the yoke plates among the respective connection portions is cut. The rotors 5 and 55 are rotatably installed at the fixed shafts J and 1S. Then, the cases 4 and 44 are installed.

The manufacturing method of FIG. 11 further includes steps of fixing the brushes 8A and 8B formed by continuously installing a plurality of connection portions at the same pitch as the above pitch at the resin bracket 222 by spot welding, and arranging the magnet 66 at the yoke plate 111.

It is noted that the present invention is not limited to the preferred embodiment described above, and it is apparent that variations and modifications by those skilled in the art can be effected within the spirit and scope of the present invention defined in the appended claims.

As described above, according to the present invention, chucking is made easy without damaging the feeder terminal portion so that automatic mounting is possible. Also, since a dead space is used, there is no difference in substantial occupation compared to the conventional circular motor and a low profile coreless type motor is possible. Also, since feeder terminal is made thin while maintaining a feature by making the yoke relatively thick, reflow soldering is made easy and an additional feeder terminal member is not necessary.

Further, the motor itself can be light and an additional shaft is not necessary. When the motor includes a resin integral with the housing, manufacturing cost decreases and heat insulation is provided during reflow soldering. Also, a stainless steel bearing is not needed and a flat brushless motor with less sliding loss is produced. Also, mass production of coreless brush motors is achieved by the manufacturing method of the present invention.

What is claimed is:

1. A non-circular flat motor comprising:
   a rotor having an axial direction;
   a stator base having a shaft supporting the rotor and that is centrally located on the stator base;
   a housing having a metal portion and a non-circular shape in a plane perpendicular to the axial direction, and being at least partially a resin; and
   at least two feeder terminals arranged at a corner of the housing, on a side surface of the housing and, electrically insulated from the metal portion of the housing.

2. The motor as claimed in claim 1, wherein the rotor is eccentric to generate vibrations during rotation.

3. The motor as claimed in claim 1, wherein the shaft has a fixed shaft core extending from a portion of the housing constituting a stator, the fixed shaft core is resin coated, the rotor is rotatably installed on the resin coated fixed shaft core, and a tip of the shaft is inserted in a concave portion of the housing.

4. The motor as claimed in claim 3, further comprising:
   a magnet;
   a magnetic yoke plate, the fixed shaft core integrally protruding from the center of the magnetic yoke plate, the magnet yoke plate constituting part of the housing;
   a bracket including the resin coated fixed shaft core and incorporating at least part of the magnetic yoke plate;
   a rotor including a commutator and an armature coil having an end connected to the commutator and rotatably supported by the resin coated fixed shaft core, the rotor facing the magnet and spaced from the magnet by a gap;
   a pair of brushes having base ends and contacts in sliding contact with the commutator and fixed such that at least two surfaces of the base ends are exposed to the bracket, wherein the magnet is placed at a yoke portion of the bracket after the brushes are installed;
   a brush recess insulating at least one of the brushes from the magnetic yoke plate; and
   a case accommodating the rotor and having a concave portion at the bracket and receiving the tip of the resin coated fixed shaft centrally in the case, at least a magnetic path portion of the magnet being a magnetic body.

5. The motor as claimed in claim 4, wherein the resin of the resin coated fixed shaft core includes a potassium titanate whisker, withstands a thermal deformation temperature of over 200° C. (18.5 kgf/cm$^2$), and is slippery.

6. The motor as claimed in claim 4, wherein the magnet is separated from the yoke plate by a gap to enable reflow soldering.

7. The motor as claimed in claim 6, wherein the magnetic yoke plate is partially separated from the case.

8. The motor as claimed in claim 7, wherein a portion for reflow soldering is located where the magnetic yoke plate is separated from the case.

9. A non-circular flat motor comprising:
   a rotor having an axial direction;
   a housing which is non-circular in a plane perpendicular to the axial direction, which rotatably supports the rotor, and which has side surfaces, at least a part of which are flat, and which includes a stator base;
   an armature coil at the stator base;
   a flat magnet on the rotor facing the armature coil and spaced from the armature coil by a gap;
   a plurality of feeder terminals arranged at the side surfaces, at corners of the housing, and electrically insulated from adjacent portions of the motor;
   a bracket as part of the housing and on which the magnet is disposed; and
   a pair of brushes, at least one of the brushes being connected to the feeder terminals through a first gap between the bracket and the magnet as insulation, wherein the rotor receives electric power via the brushes and faces the flat magnet across a second gap in the axial direction.

10. The motor as claimed in claim 9, wherein a base end of one of the brushes is part of the feeder terminal.

11. The motor as claimed in claim 9, wherein the housing is substantially rectangular in the plane and at least some of the feeder terminals do not protrude outward beyond the corners of the housing.

12. The motor as claimed in claim 9, wherein the rotor is eccentric to generate vibrations dining rotation.

13. A non-circular flat motor comprising:
   a rotor having an axial direction;
   a housing which is non-circular in a plane perpendicular to the axial direction, which rotatably supports the rotor, and which has side surfaces, at least a part of which are flat, and which includes a stator base;
   an armature coil at the stator base;
   a magnet on the rotor facing the armature coil and spaced from the armature coil by a gap;
   a plurality of feeder terminals arranged at the side surfaces, at corners of the housing, and electrically insulated from adjacent portions of the motor;
   a metal plate incorporating at a center, a shaft support, the metal plate forming a first part of the housing;
   a fixed shaft supported by the shaft support, the rotor being rotatably installed at a tip of the fixed shaft; and
   a plurality of armature coils arranged around the fixed shaft to drive the rotor, wherein a second part of the housing supports the tip of the fixed shaft.

14. The motor as claimed in claim 13, wherein the fixed shaft has a shaft core cut from a metal plate and the shaft core is coated with resin.

15. The motor as claimed in claim 13, including a pinion incorporated in the rotor and accommodated in the housing.

16. The motor as claimed in claim 13, wherein the rotor is eccentric to generate vibrations during rotation.

* * * * *